Jan. 15, 1924. 1,481,123
C. F. COWDREY
BRAKE TESTER FOR VEHICLE WHEELS
Filed April 6, 1921 2 Sheets-Sheet 2
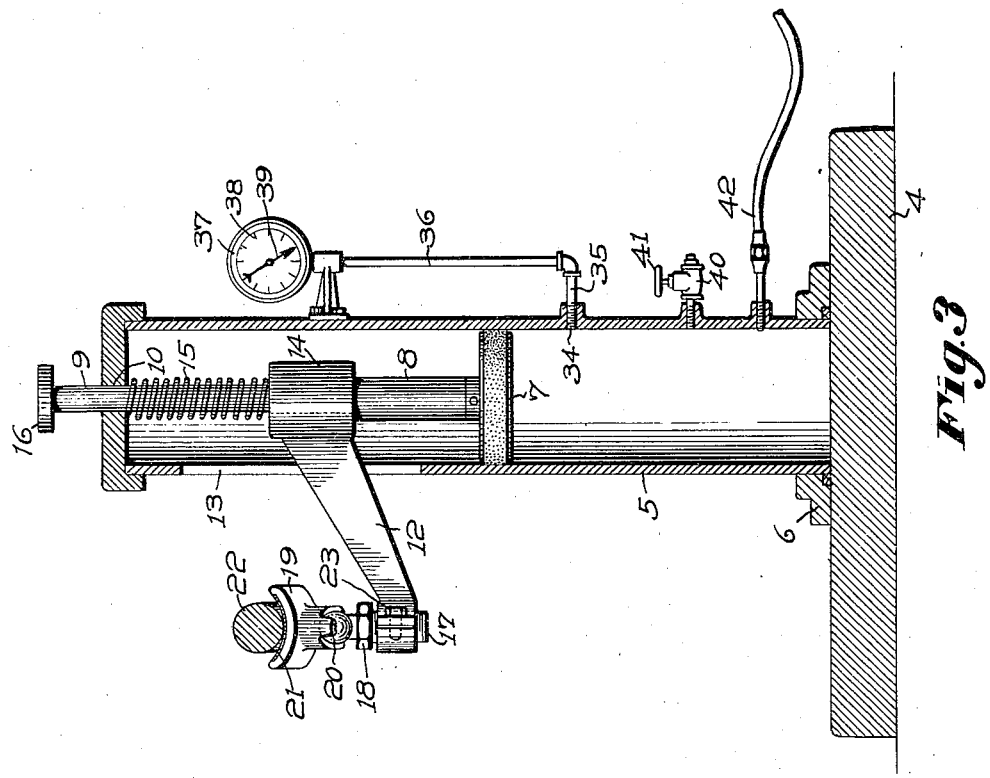
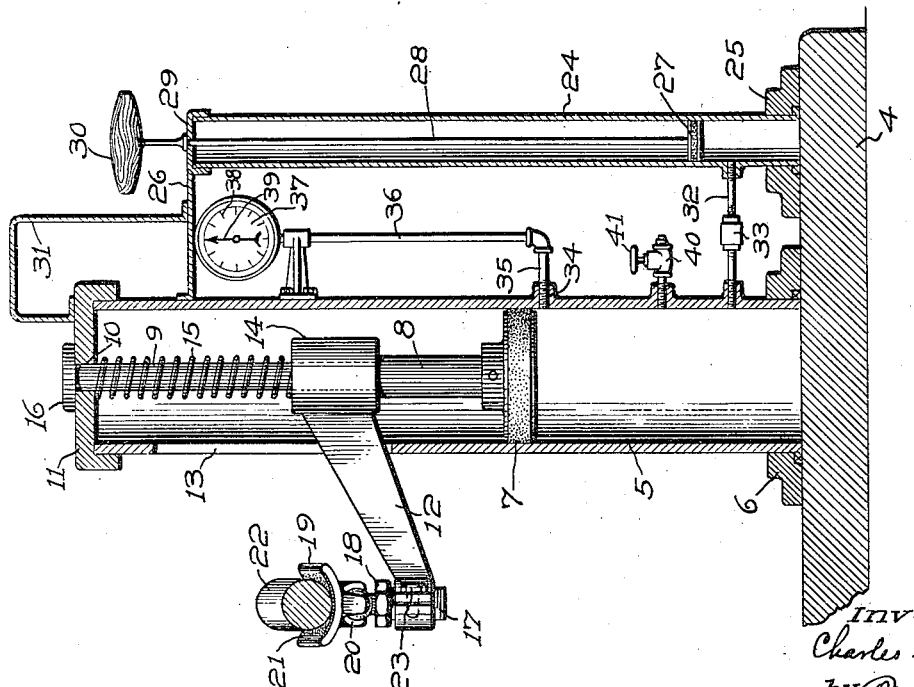
Inventor:
Charles F. Cowdrey
by Robt. O. Hair
Attorney Patented Jan. 15, 1924.

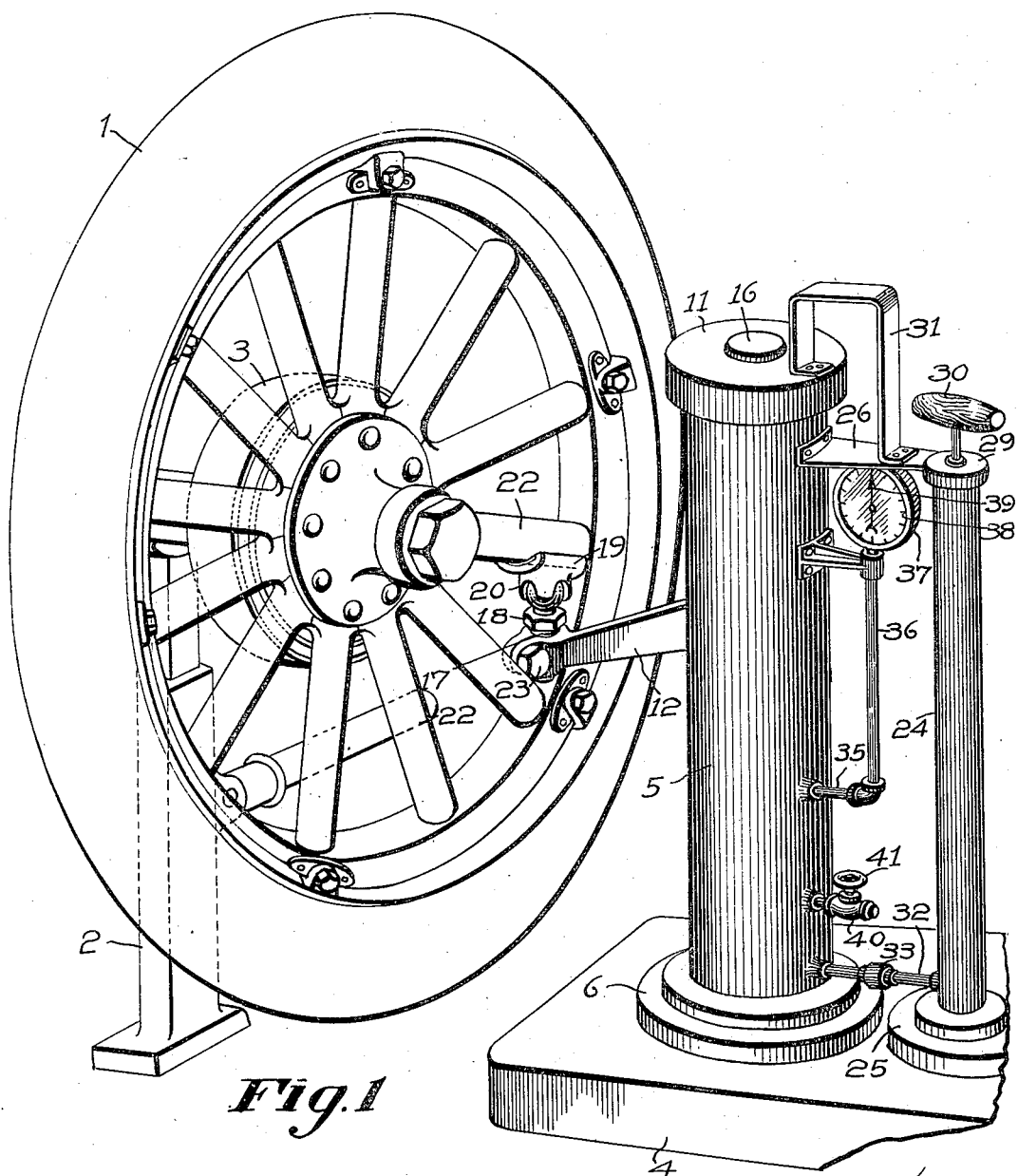

1,481,123

UNITED STATES PATENT OFFICE.

CHARLES F. COWDREY, OF FITCHBURG, MASSACHUSETTS.

BRAKE TESTER FOR VEHICLE WHEELS.

Application filed April 6, 1921. Serial No. 458,968.

*To all whom it may concern:*

Be it known that I, CHARLES F. COWDREY, a citizen of the United States, residing at Fitchburg, in the county of Worcester and State of Massachusetts, have invented an Improvement in Brake Testers for Vehicle Wheels, of which the following description, in connection with the accompanying drawings, is a specification, like characters on the drawings representing like parts.

This invention relates to means for effecting the equalization of the brake action on the wheels of a vehicle, and more particularly it has reference to a machine for testing the braking action on the wheels, in order that any inequality in the brake action may be readily equalized and made uniform.

Unless the action of the brake upon the wheels of a vehicle at opposite sides thereof is the same or substantially so, the movement of the vehicle on the application of the brake is liable to cause the vehicle itself to swerve from its direct path of movement, due to the inequality of freedom from rotation of the wheels at opposite sides of the vehicle. Such an inequality in the brake action at opposite sides of the vehicle is one of the large factors that enters into many of the accidents which are now prevalent, more especially in the automobile travel.

Where, as in the usual automobile construction, the two wheels at the opposite sides of the automobile are connected together by a differential gearing driven from the motor, any inequality of the brake action upon the wheels at opposite sides of the automobile is liable to be the fruitful source of accidents and other troubles. These facts are recognized in the automobile industry, and equalization of brake action on the wheels at opposite sides of the automobile is sought by hand adjustment of the brakes, whether of the band or shoe type. Such hand adjustment without means for comparing the action of the brakes, is guesswork, and in most instances the brakes on the wheels at the opposite sides of the automobile do not act with the same energy.

One of the objects of the present invention is to provide means whereby a comparison may be readily made between the braking action on the brakes on the wheels at opposite sides of the automobile, so that by proper adjustment of the brakes, the braking action thereof on the opposite wheels may be made uniform.

Another important object of the present invention is to provide a machine of the general type wherein, when the brake is applied to the wheel, a force may be exerted upon the wheel tending to turn it against the holding action of the brake, and indicating the force necessary to effect such turning movement of the wheel.

More specifically considered, the present invention provides a brake tester adapted to be connected to the spoke of the vehicle wheel, and by the application of force, turn the wheel while the brake is applied, an indicator being provided for determining the force necessary to turn the wheel against the brake. By noting the indication upon testing the brake action on the wheels at opposite sides of the vehicle, proper adjustment of the brakes may be made on the opposite wheels to bring the braking action into conformity on both wheels.

The present invention will hereinafter be described in connection with a pneumatic apparatus for applying the turning force to the wheel, but it is to be understood that the invention is not limited thereto, but includes within its scope other forms of mechanisms for exerting a turning pressure upon the wheel while the brake is applied for indicating the amount of force necessary to turn the wheel against the brake.

In the drawings:

Fig. 1 is a perspective view of an automobile wheel, and the association therewith of the present invention for testing the force necessary to turn the wheel against the action of the brake when the wheel is off the ground;

Fig. 2 is a section of the brake tester, showing only sufficient portions of the automobile wheel to indicate the spoke which is engaged by the tester arm;

Fig. 3 is a similar view of the modified form of the invention.

In the drawing, 1 represents a vehicle or automobile wheel which is raised from the supporting surface by a suitable form of jack 2. The jack or other means for raising the wheel of the automobile from the ground forms no special part of the present invention, and any suitable means may be employed for this purpose. Similarly, the brakes which are applied to the automobile wheel may be of any usual type. The present day practice has dictated the use of an exterior band brake on the brake drum, and an interior or emergency shoe or shoes on the inside of the drum. Either or both of these may be employed, and in the present illustration of the invention, the brake band 3 is typified, it being understood that the invention is not restricted to the character of brake.

Mounted upon a suitable support 4 is the cylinder 5 which is preferably made upright as indicated. The cylinder 5 may be secured to the support 4 in any convenient manner, and in the present instance is shown so secured by means of a securing flange 6, but such feature may be varied between wide limits.

Within the cylinder 5 is the piston 7 which is movable longitudinally of the cylinder, and secured to the piston is the stem or post 8, the upper portion 9 of which extends through a guide opening 10 in the head 11 of the cylinder 5, the construction being such that the stem and piston will move as a unit and be appropriately guided.

Secured to the stem 8 is the turning arm 12 which extends through an appropriately elongated slot 13 in the wall of the cylinder. The arm 12 is preferably secured to the stem 8 by means of an elongated hub 14 sufficiently stable to stand the stress and strains placed thereon when the brake action on the wheel is being tested.

Between the hub 14 of the turning arm and the head 11 of the cylinder is the spring 15 preferably surrounding the upper portion of the stem 9 and normally exerting a tendency to depress the stem, piston and turning arm to their lowered or initial position. In order to limit the downward movement of the piston stem, the latter may be provided with a head 16 which by contact with the upper end 11 of the cylinder will determine the downward movement of the piston and associated parts.

The turning arm 12, in the present instance of the invention, is constructed and arranged to engage one of the spokes of the wheel 1, the brakes of which are to be tested, and since the wheel has a turning movement while the turning arm has a rectilinear movement, the end of the turning arm 12 is provided with a seat which is self-conformable to the spoke of the wheel as the wheel is turned. Such conformable seat may be variously contrived, but in the present instance of the invention, the turning arm 12 has threaded through the end thereof the supporting stem 17 provided with an adjusting nut 18, and the seat 19 is connected to the stem 17 by a ball and socket joint 20. The bearing surface of the seat 19 is preferably provided with a non-abrasive cushion 21 which may bear upon the spoke 22 and prevent injury to the finish thereof.

From the construction thus far described, it will be apparent that as the wheel is turned under the action of the turning arm 12, the seat 19 will adjust itself to the requirements incident to the different paths of travel of the wheel spoke and the seat. In order that the threaded stem 17 may be secured in adjusted position, the end of the turning arm 12 is provided with a clamp 23, which upon being set up will hold the stem from turning movement.

Having more particular reference to Fig. 2, the support 4 has connected therewith an air hand pump, which in the present instance of the invention, consists of the cylinder 24, the lower end of which is appropriately secured to the support 4, as for instance, by the securing flange 25, and the upper end of the cylinder 24 is braced, as for instance, by the bridge-piece 26 extending between the cylinder 5 and the cylinder 24.

Within the cylinder 24 is the piston 27, the upwardly extending stem 28 of which passes through the upper head 29 of the cylinder 24, and exterior to the cylinder is provided with the operating handle 30. In order that the machine or apparatus may be conveniently transported when it is of the portable type, a convenient handle 31 is provided.

Between the cylinder 5 and the cylinder 24 is the conduit 32 which may be provided with the right and left hand adjusting sleeve 33, and if desired, a suitable check valve may be employed, although this is not essential.

From the construction thus far described, it will be apparent that when the hand pump is operated, air will be forced from the cylinder 24 into the cylinder 5 below the piston 7, and when sufficient pressure has been applied to the piston to overcome the action of the brake on the wheel, the piston, and perforce the turning arm 12 will rise, thereby turning the wheel through an arc sufficient to test the energy of the brake.

In order that the brakes on the wheels at opposite sides may act with equal braking energy, it is necessary to provide some means of indicating the force required for turning the wheel while the brake is applied. A suitable indicator is employed for this purpose, and where the force employed for turning the wheel against the brake is compressed air, the indicator may be and preferably is of the air pressure type.

In the present instance of the invention, the wall of the cylinder 5 has a side opening 34 into which is tapped the pipe or conduit 35 leading through a connected conduit 36 to an indicator 37. The indicator 37 may be of any usual type, and provided with divisions 38 to which the pointer 39 will direct attention when the air has reached a sufficient compression to turn the wheel against the brake. While the air compression indicator is shown as a convenient means for indicating the force necessary to turn the wheel against the brake, it is to be understood, of course, that any suitable indicating means which will render accurate comparison between the forces necessary to turn the wheels against the brakes at opposite sides of the vehicle may be employed.

When the test of an applied brake has been completed, and the indication on the indicator has been noted, it is desirable that the turning arm 12 and piston may be returned to their normal position. This may be appropriately effected by a relief valve 40 leading into the cylinder 5 and normally closed by the hand manipulated valve 41. By opening the valve, the air pressure in the cylinder 5 below the piston may be relieved.

The construction illustrated in Fig. 2 is advantageously employed where there is no storage of air pressure, as for instance, in private automobile garages, but where an air pressure reservoir is employed, the cylinder 5 may be connected directly to the reservoir instead of a hand air compression. This modification of the device is indicated in Fig. 3, wherein the cylinder 5 is connected by a conduit 42 with a compressed air reservoir. Since the remaining features of the modified construction of Fig. 3 are or may be of the same general type of construction as that of Fig. 2, it will be unnecessary to discuss in detail the features of the modified construction.

In testing the brakes of the wheels at opposite sides of the vehicle, the wheels are jacked up from the ground or supporting surface. The brake which is to be tested is then applied as usual, the wheel previously having been turned to bring a spoke, as 22, somewhat below the horizontal. The brake tester is then applied to the wheel by placing the cushion of the turning arm 12 under the positioned spoke, and preferably near the outer extremity thereof. The air pressure is then introduced into the cylinder 5 either by the hand pump as described with reference to Figs. 1 and 2, or by the conduit leading to a reservoir of air pressure. As the air pressure increases in the cylinder below the piston, the latter will finally turn the wheel through a small angle against the action of the brake, and at the same time the indicator will indicate the force necessary to thus turn the wheel against the brake. Notation is made of this, and then the air pressure in the cylinder is reduced by the hand manipulation of the valve 41, and the same operation is performed with respect to the wheel at the opposite side of the vehicle or automobile, and notation made of the indicator reading. Should these readings be unequal, the brakes are adjusted until upon repetition of the testing operation, the indicator shows that the brakes at opposite sides of the vehicle or automobile are acting with uniform energy.

What is claimed is:—

1. A brake tester for vehicle wheels, comprising, in combination, means for applying force to a wheel of a vehicle sufficient to turn the wheel under brake resistance and while the wheel is relieved from the weight of the vehicle, including a support, means guided by said support to move along a vertical path, mechanism for imparting movement to the guided means, means carried by the guided means to engage the wheel and impart the movement of the guided means thereto, and means for indicating the force exerted upon the wheel when the wheel responds to the turning movement.

2. A brake tester for vehicle wheels, comprising, in combination, means for applying force to a vehicle wheel sufficient to turn the wheel under brake resistance, including a support, means guided by said support to move along a vertical path, mechanism for imparting movement to the guided means, means adapted to engage the vehicle wheel and impart the movement of said guided means to the wheel, and means for indicating the force exerted upon the wheel when the wheel responds to the turning movement.

3. A brake tester for vehicle wheels, comprising, in combination, means for applying force to a wheel of a vehicle sufficient to turn the wheel under brake resistance and while the wheel is relieved from the weight of the vehicle, including an arm for engaging the wheel at a point radially distant from the wheel axis, a support, means upon said support for lifting said arm to rotate the wheel, and means for indicating the force exerted upon the wheel when the wheel responds to the turning movement.

4. In a brake tester for automobile wheels, the combination of a support adapted to be positioned to one side of a wheel and out of contact therewith, wheel engaging means carried by said support, power-operated means upon said support and connected to the wheel engaging means to impart wheel turning movement thereto, and means for indicating the force exerted upon the wheel when the wheel responds to the turning movement.

5. In a brake tester for automobile wheels, the combination of a support adapted to be positioned to one side of a wheel and out of contact therewith, an arm movably carried by said support, a swivel seat upon said arm and adapted to engage a portion of the wheel adjacent the wheel rim, means for imparting movement to said arm to turn the wheel, and an indicator for indicating the force required to turn the wheel.

6. In a brake tester, the combination of an arm having a seat for engaging the spoke of a vehicle wheel, said seat being self conformable to the spoke as the wheel is turned, means for applying force to the arm tending to turn the wheel while the brake is applied, and an indicator for indicating the force applied to the wheel through the arm.

7. In a machine for determining the brake resistance to the turning movement of a vehicle wheel, the combination of an arm for engaging a spoke of a wheel, means for moving the arm for exerting a turning force upon the wheel while the brake is applied, means for guiding the movement of the arm, and means for indicating the force exerted to move the arm.

8. In a machine for determining the brake resistance to the turning movement of a vehicle wheel, the combination of a supporting base, a cylinder mounted on the base, a piston movable in said cylinder, an arm connected to the piston and constructed and arranged to engage the vehicle wheel, means for introducing air pressure in the cylinder for moving the piston and arm in one direction to exert a force tending to turn the wheel while the brake is applied, and an indicator for indicating the air pressure required to turn the wheel.

9. In a machine for determining the brake resistance to the turning movement of a vehicle wheel, the combination of a supporting base, a cylinder mounted on the base, a piston movable in said cylinder, an arm connected to the piston and constructed and arranged to engage the vehicle wheel, means for introducing air pressure in the cylinder for moving the piston and arm in one direction to exert a force tending to turn the wheel while the brake is applied, an indicator for indicating the air pressure required to turn the wheel, and means for moving the piston and arm in the opposite direction.

10. In a brake tester for the wheels of an automobile, the combination of a support, a cylinder mounted on the support, a piston movable in the cylinder, a stem connected to the piston and guided in its movement therewith, an arm connected to the stem and adapted to be engaged with the wheel of an automobile, means for introducing air pressure in the cylinder to operate the piston and arm and exert a force tending to turn the wheel while the brake is applied, and means for determining the air pressure required to turn the wheel.

11. In a brake tester for the wheels of an automobile, the combination of a support, a cylinder mounted on the support, a piston movable in the cylinder, a stem connected to the piston and guided in its movement therewith, an arm extending through the wall of the cylinder and connected to the stem and adapted to be engaged with the wheel of an automobile, means for introducing air pressure in the cylinder to operate the piston and arm and exert a force tending to turn the wheel while the brake is applied, and means for determining the air pressure required to turn the wheel.

12. In a brake tester for the wheels of an automobile, the combination of a support, a cylinder mounted on the support, a piston movable in the cylinder, a stem connected to the piston and guided in its movement therewith, an arm connected to the stem and adapted to be engaged with the wheel of an automobile, means for introducing air pressure in the cylinder to operate the piston and arm and exert a force tending to turn the wheel while the brake is applied, means for determining the air pressure required to turn the wheel, and means for exhausting the air from the cylinder to permit the piston and stem to return to original position.

13. A brake tester for vehicle wheels, comprising, in combination, a support, an upright post guided by the support for vertical movement, an arm extending laterally from the post and provided with means engageable with a wheel to rotate it, means for imparting a lifting movement to the post and arm to exert a turning force upon the wheel, and means for indicating the force required to turn the wheel under brake resistance.

14. A brake tester for vehicle wheels, comprising, in combination, a support, an arm extending laterally from the support and mounted thereupon for movement bodily in a vertical direction, means upon the arm engageable with a vehicle wheel to rotate it, means for imparting a vertical movement to the arm, and means for indicating the force required to turn the wheel under brake resistance.

In testimony whereof, I have signed my name to this specification.

CHARLES F. COWDREY.